R. B. RESPESS.
COMPOSITE UNWOVEN FABRIC AND PROCESS FOR MAKING THE SAME.
APPLICATION FILED NOV. 14, 1917.
1,355,265.                                          Patented Oct. 12, 1920.
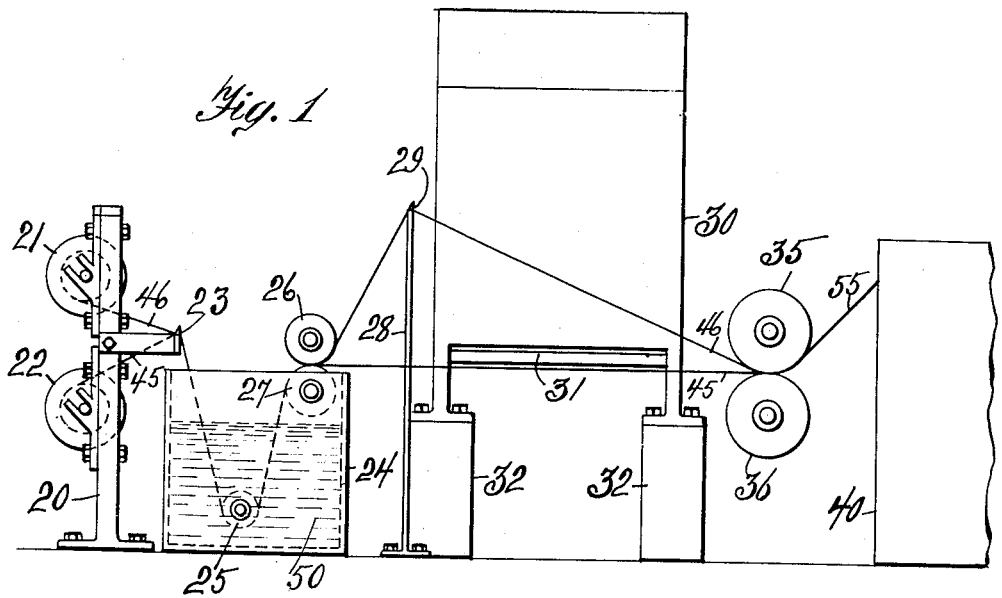
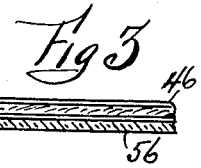
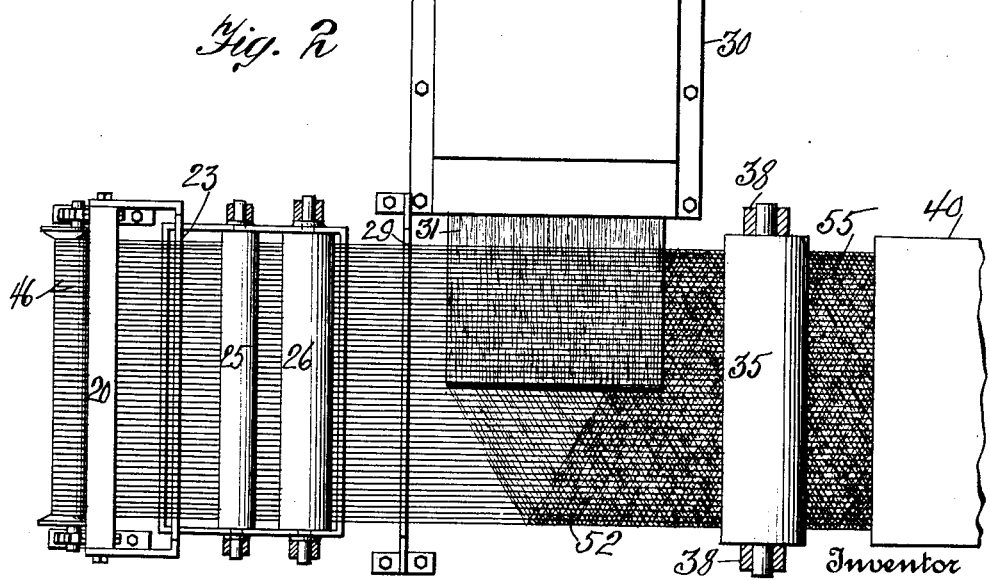
Inventor
Roland B. Respess
By his Attorney

UNITED STATES PATENT OFFICE.

ROLAND B. RESPESS, OF NEW YORK, N. Y.

COMPOSITE UNWOVEN FABRIC AND PROCESS FOR MAKING THE SAME.

1,355,265.   Specification of Letters Patent.   Patented Oct. 12, 1920.

Application filed November 14, 1917. Serial No. 202,013.

*To all whom it may concern:*

Be it known that I, ROLAND B. RESPESS, a citizen of the United States, and a resident of the borough of Manhattan, city of New York, in the county of New York and State of New York, have invented certain new and useful Improvements in a Composite Unwoven Fabric and Processes for Making the Same, of which the following is a specification.

This invention relates to an improved article of manufacture and improved process for making the same.

This invention in part is an improvement of the invention described in my patent application for rubber fabric and molded rubber and process for making the same, filed in the United States Patent Office on or about July 13th, 1917, Serial Number 180,428.

One object of the present invention comprises the production and process of making a strong pliable unwoven fabric which may have incorporated therewith flexible threads or cords and which may be stretched easily in one or two directions and be substantially non-stretching in one or two other directions, so that it may be readily formed around the core in making a pneumatic tire or tube such as rubber hose in the manner that woven fabric is used.

A second object is to construct such fabric in an economical manner and by a more rapid method than is employed in weaving or in looping the threads or cords over pins or hooks at the edges of the fabric.

A third object is to economically and rapidly produce an unwoven fabric, with threads parallel to each other, but run at an angle to the length of the fabric, and when two or more layers of the threads are superimposed on each other, the threads in one layer of threads making angles, preferably right angles, with the threads of the next adjacent layer of threads.

A fourth object is to produce an unwoven fabric in which are incorporated parallel threads attached by some cohesive substance, such as a sheet of rubber, or an unwoven sheet of fiber or to a woven fabric.

Other objects are obvious and will in part hereinafter be pointed out. The invention also consists in the steps to produce the product and the relation of each step with the other steps of the process.

The new process primarily consists of taking a number of threads or cords of suitable fibers such as cotton, ramie or the like and which have been wound on spools or other containers, and locating the latter on a suitable frame. The threads or cords are then unwound from the spools and treated with a binding agent or solution such as a compound of rubber, to saturate or coat the threads or cords therewith. This latter step may be carried out in a vacuum if desired.

After being coated the threads or cords are brought parallel to each other preferably by guiding them to a roll or drum, one a little after the next adjacent thread, after which step the binding agent causes them to adhere together if they are brought into contact with each other. By this means air pockets are avoided between the threads or cords, or the threads or cords may be separated from each other as described hereinafter.

In cases where perfect saturation is desired small threads or yarns may be passed through the solution and two or more of the threads or yarns may then be twisted together to form a cord or larger thread and thereafter pass to the roll or drum as stated.

It is also possible to coat the threads by the friction method, that is to say passing them over a gathering roll, adjacent to another roll turning at a faster rate of speed. A film of rubber compound is carried on the faster running roll and which bears against the threads or cords and deposits the rubber in proper quantities on the threads on the slower running roll.

The sheet of threads thus formed by cohesion in passing over the said drum, passes from the latter to drying frames or may be rolled up, between sheets of woven fabric to prevent the adhesive sheets of threads or cords from coming into contact with each other in the roll.

It is evident that by means of guides the threads may be placed parallel in contact with each other or at any required distance apart, and that the width of the sheet will depend only on the width of the frames, the length of the gathering rolls, and the number of threads in the sheet.

When the coated threads are brought close together, so that they touch each other, for some purposes the binding agent or cohesive mixture with which the threads are coated will hold the threads in place and without a further binding agency and may be used in forming the fabric contemplated, wherein the threads run at an angle to the length of the sheet as hereinafter described.

In most cases however I prefer to add an additional binding agent in the form of a sheet of binding material, which is obviously required where the threads or cords are not in contact nor sufficiently close so the binder or cohesive coating will hold the threads in their parallel position.

This additional binding sheet may be applied to the threads in several different ways and I do not limit myself to any one method. It is possible also to use a variety of material for the binding sheet.

The binding sheet may be composed of a thin sheet of rubber, a thin sheet of matter fibers saturated with a rubber or other cohesive material, or it may be a thin woven fabric. These binding sheets may be passed over the roller and the coated threads be deposited thereon and caused to adhere thereto. Or instead of a sheet or fabric as described a thin layer of fiber may be blown on or between the threads to constitute the binding sheet when the threads have been brought into parallel position on the roll or after they have passed from the roll, or a thin layer of fiber may be thrown on the threads, after they are in position on the roll or after they have left the roll, by a carding or garnetting machine. In some cases after the threads or cords are placed in position with their binding sheets it may be desirable to press them thereto by forcing them and cause the coated threads to adhere more firmly to the binding sheet.

The next step in my process consists in taking the sheets of located threads or cords made in the manner described, and constructing other sheets therefrom in which the threads or cords cross the sheet at an angle to the lengthwise of the sheet. Two or more of the latter sheets may be superimposed on each other, so that the threads in one sheet run at an angular direction to the directions of the threads in the next adjacent sheet. Another combination, comprises one layer or sheet of located threads or cords, with a second layer of sections superimposed thereon of the same material but with the threads or cords located in angular positions to the threads or cords of the first layer.

In preparing the sheet of located threads or cords as hereinbefore described it is obvious that the threads may be drawn from spools, pass through the coating mixture and be placed in position at a very rapid speed, as compared with the slow process of weaving, also that these sheets may be cut as desired without disturbing the position in which the threads have been placed.

In my process when it is desired to have a single layer of threads cross a sheet at an angle or to have two or more sheets superimposed on each other, with the threads crossing in an angular direction, it becomes necessary to cut the prepared sheets and to join the sections together.

I therefore employ the following method in joining the sections to each other. When a sheet is desired on which a single layer of located threads or cords are to cross the sheet at an angular direction, I cut the prepared sheets of located threads or cords at an angle of preferably 45 degrees. I then take a cut section and place it on a foundation sheet of rubber, unwoven fiber fabric or a woven fabric and press the section on said foundation sheet or fabric so it firmly adheres thereto. In placing the sections I locate the cut ends at the edges of the foundation sheet on which they are placed, so that the parallel threads run at an angle to the lengthwise of the foundation sheet. I then place another cut section on the foundation sheet with the parallel threads of one cut section parallel with the threads in the other cut section, and by continuing this process I make as long a built up sheet as may be desired. Two of the built up sheets may be used together by superimposing one on the other and pressing them together. I also construct a built up sheet by pressing against each side of a foundation sheet a sheet of cut sections of located threads or cords, with the directions of the cords on one side of the foundation sheet making angles with the threads or cords on the other side thereof.

Another method may be employed in which the cut sections may be placed on a flat surface or moving belt and after one layer of cut sections are placed thereon another layer may be placed on the first layer with the threads of one layer crossing the threads of the other layer and when pressed together the two layers will adhere each to the other and form a sheet without employing any but the cut sections. One sheet of cut sections of this modification becomes foundation for the other.

In some cases it may be found desirable to add a coating of the adhesive mixture to the foundation sheet to secure additional cohesion.

In the use of rubber I do not desire to limit myself to any special mixture of rubber but any compound of rubber or rubber cement may be used. In most cases where rubber is the basis of the adhesive mixture, sulfur or other vulcanizing agent is added to the mixture so that the product may be vulcanized. Also by the inclusion of suitable coloring materials the product may be made of one or more colors as desired.

I do not desire to limit myself to the use of rubber as an adhesive or binding agent inasmuch as my method produces an unwoven fabric superior for many purposes to a woven fabric. For instance varnish or gums may be used as a binding agent instead of the rubber in producing the unwoven fabric according to the steps heretofore described. When the sheets have been prepared with varnish or gum, they may be stretched on the frames of aeroplane wings and shrunk in the usual manner.

In the accompanying drawings Figure 1 shows a side elevation of an apparatus to carry out an exemplification of the steps of the process; Fig. 2 represents a top plan view of Fig. 1 and Fig. 3 is a longitudinal cross-section of the product formed.

A frame 20 has journaled therein the upper roll 21 and the lower roll 22. A comb 23 is supported on the frame 20. A tank 24 has journaled therein the guide roller 25 and is provided with the squeeze rollers 26 and 27. A frame 28 supports a comb 29. A carding machine 30 with a reciprocating apron 31 is supported on the foundation blocks 32. Pressure rollers 35 and 36 are journaled in bearings 38. A drying chamber is indicated at 40.

To make the fabric threads 45 such as cotton, ramie or the like are unwound from the roll 22 and similar threads 46 are unwound from the roll 21. The threads 45 and 46 pass in parallel lines over the comb 23, enter the tank 24 and are immersed in the solution of a binding agent 50. This binding agent may be a compound of rubber, which saturates and coats the threads 45 and 46. The threads are guided under the roller 25 and then pass between the squeeze rollers 26 and 27 when the excess solution is pressed out of the threads. The threads are then separated into two layers, the threads 46 inclining upwardly and passing over the comb 29 and the threads 45 taking horizontal directions. Both layers of threads pass between the pressure rollers 35 and 36. The reciprocating apron 31 discharges a thin sheet of combed fibers 52 upon the layer of threads 45. The fibers 52 by reason of the reciprocations of the apron 31 are deposited in angular directions as indicated upon the threads 45. The threads and fibers now pass between rollers 35 and 36 when they are pressed together and one compact sheet 55 is formed. The sheet 55 enters the drying chamber 40 where any superfluous solution is evaporated. A foundation sheet 56 of rubber or other material may be pressed to the sheet 55 before or after it enters the chamber 40.

Having described my invention what I desire to secure by Letters Patent and claim is:

1. The herein described process of making an unwoven fabric consisting of coating threads or cords with a binding agent, locating the threads or cords parallel to each other, coating a second set of parallel threads or cords with a binding agent, depositing a thin layer of fibers between the sets of threads or cords to constitute a binding sheet for both sets of threads or cords, locating the two sets of threads or cords parallel to each other and in contact with the thin layer of fibers and held in place thereby, locating the product formed on a foundation sheet of rubber and pressing the elements together.

2. An unwoven fabric comprising two sets of parallel threads or cords coated with a binding agent and a thin layer of fibers between the sets of threads or cords.

3. An unwoven fabric comprising two sets of parallel threads or cords coated with a binding agent, a thin layer of fibers between the sets of threads or cords and a sheet of rubber attached to the product.

Signed at the borough of Manhattan, city of New York in the county of New York and State of New York this 8th day of November A. D. 1917.

ROLAND B. RESPESS.

Witnesses:
A. A. DE BONNEVILLE,
A. W. BAKER.